United States Patent [19]
Runyon et al.

[11] Patent Number: 5,129,415
[45] Date of Patent: Jul. 14, 1992

[54] SYSTEM AND METHOD FOR AUTOMATICALLY SELECTING ONE OF A PLURALITY OF LIQUID SUPPLY RECEPTACLES AS A SOURCE FOR A LIQUID DISPENSING APPARATUS

[75] Inventors: Robert R. Runyon, 9789 Evenson Cir., South Jordan, Utah 84065; Kent W. Mabey, West Jordan, Utah

[73] Assignee: Robert Richard Runyon, South Jordan, Utah

[21] Appl. No.: 742,063

[22] Filed: Aug. 6, 1991

Related U.S. Application Data

[63] Continuation of Ser. No. 329,774, Mar. 26, 1989, abandoned.

[51] Int. Cl.$^5$ .............................................. E04H 4/12
[52] U.S. Cl. ..................................... 137/113; 137/93; 210/101; 210/169; 361/284
[58] Field of Search .............. 137/113, 112, 93; 417/7, 8, 36, 5; 244/135 R, 135 C; 210/101, 169; 361/284

[56] References Cited

U.S. PATENT DOCUMENTS

| | | | |
|---|---|---|---|
| 2,409,245 | 10/1946 | Black | 244/135 R |
| 2,557,438 | 6/1951 | Johnson | 417/7 |
| 3,120,118 | 2/1964 | Boyle | 73/3 |
| 3,412,292 | 11/1968 | Forbes | 317/123 |
| 3,763,878 | 10/1973 | Harden | 137/114 |
| 3,897,798 | 8/1975 | De Vale | 137/93 |
| 3,919,938 | 11/1975 | Goldberg et al. | 101/401.1 |
| 4,071,725 | 1/1978 | Smith et al. | 200/82 E |
| 4,091,833 | 5/1978 | Ellis et al. | 137/93 |
| 4,224,154 | 9/1980 | Steininger | 210/169 |
| 4,247,018 | 1/1981 | Credle | 137/113 |
| 4,274,509 | 6/1981 | Thomson et al. | 184/15 B |
| 4,278,858 | 7/1981 | Kaessen | 200/84 B |
| 4,316,145 | 2/1982 | Tann | 324/208 |
| 4,364,270 | 12/1982 | Heinzl et al. | 73/298 |
| 4,491,059 | 1/1985 | Martin | 92/5 L |
| 4,545,020 | 10/1985 | Brasfield | 361/284 |
| 4,603,581 | 8/1986 | Yamanoue et al. | 361/284 |
| 4,769,137 | 9/1988 | Powell, Jr. | 210/169 |
| 4,829,837 | 5/1989 | Telfer | 361/284 |

FOREIGN PATENT DOCUMENTS 136286  6/1979  Fed. Rep. of Germany .......... 417/5

OTHER PUBLICATIONS

Covert, P. R. et al., "Position and Proximity Sensors: Getting smaller, smarter, cheapter," I&CS—The Industrial and Process Control Magazine, pp. 59–61 (Nov. 1985).

*Primary Examiner*—John Rivell
*Assistant Examiner*—L. R. Leo
*Attorney, Agent, or Firm*—Workman, Nydegger & Jensen

[57] ABSTRACT

A system and method for selecting one of a plurality of liquid supply receptacles as a source of supply for a liquid dispensing apparatus is disclosed. As liquid is withdrawn from the supply receptacle the dielectric constant of the liquid is sensed in order to detect any undissolved gases (i.e., bubbles) which are present in the liquid. The presence of bubbles within the liquid indicates that a supply receptacle has become empty or indicates a failure of components associated with one of the supply receptacles. Upon the detection of undissolved gases within the liquid withdrawn from a supply receptacle, the present invention causes another liquid supply receptacle to be selected as a source of supply for the liquid dispensing apparatus. Embodiments of the present invention desirably also include switches for manually inputting when a liquid supply receptacle has been refilled or replaced, indicators for visually showing the status of the system, and a remote annunciator for communicating the status of the system to a point remote from the liquid supply receptacles.

22 Claims, 7 Drawing Sheets

SYSTEM AND METHOD FOR AUTOMATICALLY SELECTING ONE OF A PLURALITY OF LIQUID SUPPLY RECEPTACLES AS A SOURCE FOR A LIQUID DISPENSING APPARATUS

This application is a continuation of U.S. application Ser. No. 07/329,774, filed Mar. 26, 1989, for a System and Method for Automatically Selecting One of a Plurality of Liquid Supply Receptacles as a Source for a Liquid Dispensing Apparatus now abandoned.

BACKGROUND

1. The Field of the Invention

This invention relates to systems and methods for maintaining a flow of a liquid from one of a plurality of supply receptacles to a liquid dispensing apparatus. More particularly, the present invention relates to apparatus and methods for automatically selecting one nonempty supply receptacle from a plurality of supply receptacles as each of the supply receptacles is emptied and using the selected supply receptacle as a source of supply for a liquid dispensing apparatus.

2. The Background Art

Many facets of modern society routinely rely on the operation of liquid dispensing systems which dispense controlled amounts of a liquid into a fluid flow. For example, chlorine compounds are used as a disinfectant for both large and small scale culinary water supplies as well as being used to control microorganism growth in swimming pool water and in other industrial uses. Often chlorine containing liquids and other useful chemicals are transported and stored in liquid supply receptacles such as metallic or plastic drums which are well known in the art or smaller bucket-like receptacles or tanks.

Many liquid dispensing systems are often left operating for long periods of time without human intervention or attention. For example, owners and operators of swimming pools often let several days pass before checking the condition of the pool water and the operation of the pool equipment.

Also, many commercial and industrial sites are located a distance from a manned office and often operate unattended for long periods of time. In such applications, a reoccurring problem is the unnoticed emptying of a supply receptacle or the failure of a pump of other system component resulting in the loss of liquid dispensing function for a time. The negative consequences of such an unnoticed failure may be serious if it involves the disinfection of a culinary water supply or some other vital system.

While practices such as utilizing larger supply receptacles and scheduling more frequent inspections would do much to alleviate such problems, both economic and practical constraints prevent such approaches from being completely effective. Moreover, due to the non-vital nature of many liquid dispensing systems, owners and operators of such systems often forego taking effective steps to prevent the interruption of a flow of a liquid chemical because of the added cost or inconvenience.

In view of the problems and disadvantages which have heretofore existed in the art, it would be an advance in the art to provide a system and method for automatically maintaining a source of supply to a liquid dispensing system. It would also be an advance in the art to provide a system for maintaining the availability of a source of liquid which is reliable and which may be left to operate unattended.

It would be another advance in the art to provide a system for selecting one of a plurality of liquid supply receptacles as a source of liquid which may be installed at a remote site and which can announce to a distant location when attention is required at the remote site, such as when a supply receptacle has been emptied. It would be another advance in the art to provide a system and method for selecting one of a plurality of liquid supply receptacles wherein the sensing element does not require direct contact with the liquid.

OBJECTS AND BRIEF SUMMARY OF THE INVENTION

In light of the above described problems and drawbacks, the objects of the present invention will be briefly stated.

One object of the present invention is to provide a dependable and cost effective system and method for selecting one of a plurality of liquid supply receptacles for supplying liquid to a liquid dispensing apparatus.

Another object of the present invention is to provide a system for selecting one of a plurality of liquid supply receptacles which is highly reliable and may be left to operate unattended.

It is a further object of the present invention to provide a system for selecting one of a plurality of liquid supply receptacles which may be installed at a remote site and which can announce to a distant location when attention is required at the remote site, such as when a supply receptacle has been emptied.

It is also an object of the present invention to provide a system for selecting one of a plurality of liquid supply receptacles wherein the sensing element does not require direct contact with the liquid.

Additional objects and advantages of the invention will be set forth in the description which follows, or may be learned by the practice of the invention. The objects and advantages of the invention may be realized and obtained by means of the instruments and combinations particularly pointed out in the claims appended hereto.

To achieve the foregoing objects, and in accordance with the invention as embodied and broadly described herein, a sensing means is provided which senses changes in the dielectric constant of the fluid contained within a sensing chamber. The fluid within the sensing chamber desirably and generally includes substantially only the liquid which is withdrawn from one of the plurality of liquid supply receptacles. When substantial amounts of undissolved gasses are mixed in with the liquid, to form bubbles such as occur when a supply receptacle is nearly empty or a supply pipe is punctured or disconnected, changes in the dielectric constant of the fluid mixture (i.e. the liquid and gas mixture) contained within the sensing chamber is sensed.

In the preferred form of the present invention, the changes in the dielectric constant of the fluid within the sensing chamber are sensed by a capacitive proximity sensor. The change in dielectric constant sensed by the capacitive proximity sensor is processed by a detection means, and if the change to the dielectric constant exceeds a predetermined threshold, the system then selects another liquid supply receptacle as a source for the liquid dispensing apparatus.

In the preferred embodiment, the liquid supply receptacles may include tanks or other structures for containing a liquid. In some embodiments, flow control means, such as pumps, may be included in the system and associated with the liquid supply receptacles to pump the fluid from the supply receptacle to the sensing chamber. The present invention includes selection means for selecting one from among the plurality of liquid supply receptacles. The present invention may also include a power back-up means, remote annunciation and means for remotely announcing when the system requires attention, for example, when a supply receptacle has been emptied.

BRIEF DESCRIPTION OF THE DRAWINGS

In order that the manner in which the above recited and other advantages and objects of the invention are obtained, a more particular description of the invention briefly described above will be rendered by reference to the specific embodiments thereof which were illustrated in the accompanying drawings. Understanding that these drawings depict only typical embodiments of the invention and are therefore not to be considered limiting of its scope, the invention will be described with additional specificity and detail through the use of the accompanying drawings in which.

DESCRIPTION OF THE PREFERRED EMBODIMENT

Figure 1:
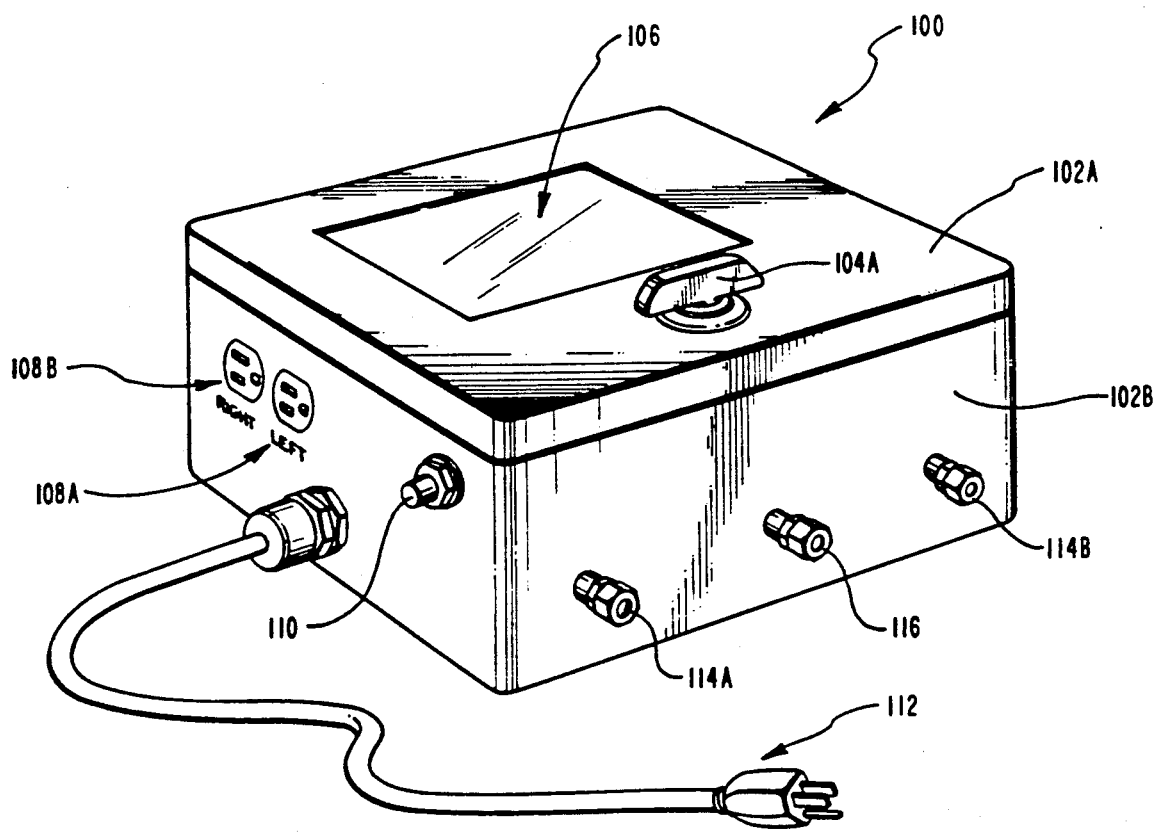
FIG. 1 is a perspective view of one embodiment of the present invention.

Represented in FIG. 1 is an exterior perspective view of the presently preferred embodiment of the present invention, generally designated 100. The embodiment of the invention represented in FIG. 1 is a compact unit which has application in many different circumstances.

Figure 3:
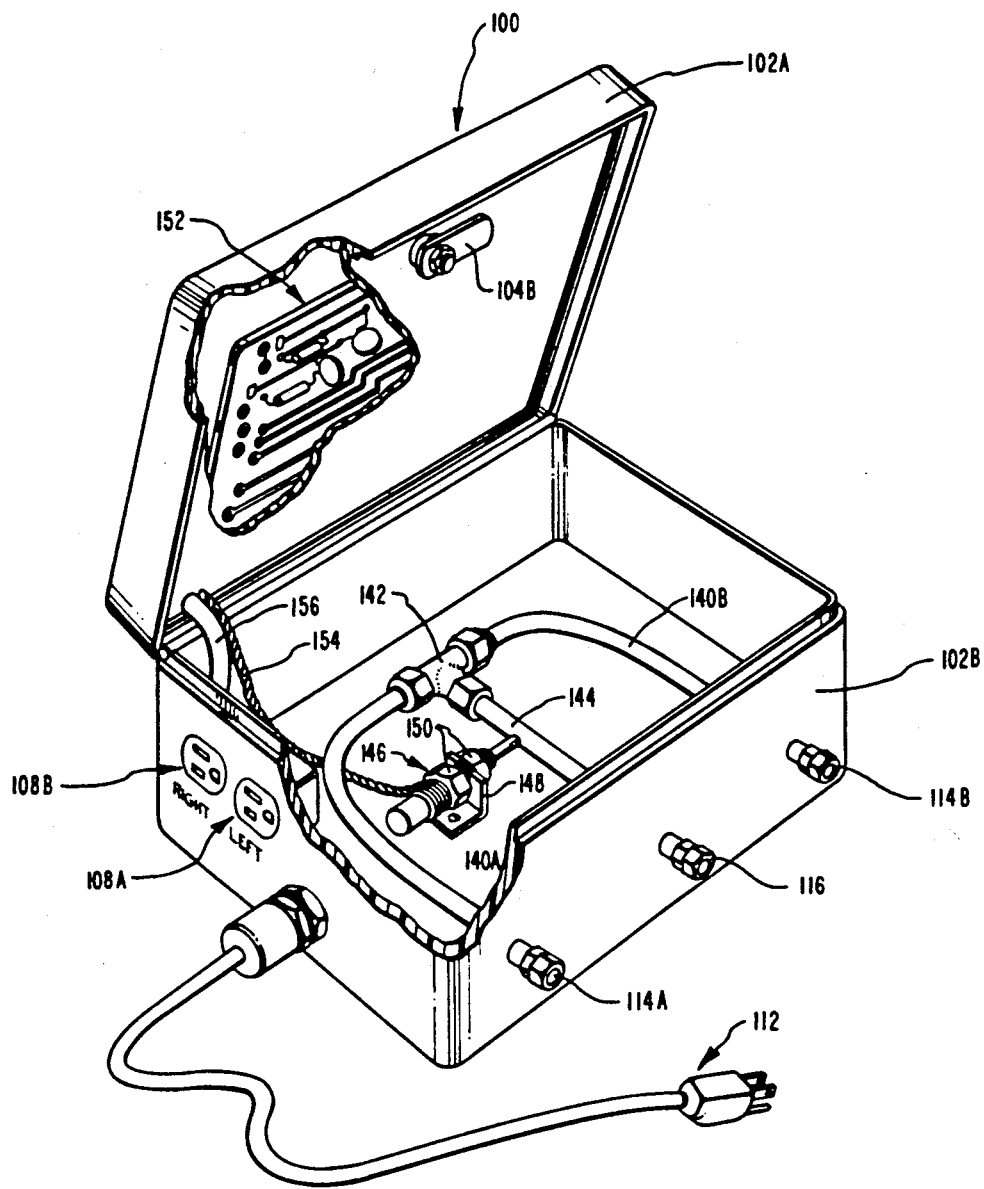
FIG. 3 is a partially cut-away perspective view of the embodiment represented in FIG. 1.

The components of the system (which will be described in detail shortly) are enclosed within a housing which includes upper housing 102A and lower housing 102B which are provided with a hinge to allow the housing to be opened in a clam-shell fashion as shown in FIG. 3. The housing may be secured closed by operation of latch handle 104A to form a moisture resistant case to protect the components contained therein. Also represented in FIG. 1 is an indicator and control panel, generally designated 106, an AC power switch 110, and a power cord generally designated 112.

As will be appreciated by those skilled in the art, there are many applications in which the present invention will provide great benefits, including, residential, commercial, and industrial situations. For example, many industries need to maintain the availability of a source of a liquid to carry on various processes. Examples of such industries include food processing, heating and cooling plants, chemical manufacturing facilities, and so forth. Disadvantageously, if a supply of a particular liquid is exhausted, it is often the case that operation of the process must be halted until the supply is replenished. Thus, the present invention can greatly benefit many situations by automatically maintaining the availability of a source of liquid by selecting a nonempty supply receptacle as a source of a liquid.

The embodiment represented in FIG. 1 is particularly adapted for maintaining a source of liquid supply from two liquid supply receptacles. Fluid from a first liquid supply receptacle, also referred to as the left supply receptacle, is fed into a left inlet port 114A. Likewise, liquid from a second liquid supply receptacle, also referred to as the right liquid supply receptacle, is fed into a right inlet port 114B.

Continuing to refer to FIG. 1, a left electrical supply receptacle 108A and a right electrical supply receptacle 108B are provided. The electrical supply receptacles 108A-B are provided to power pumps which feed fluid under pressure to left inlet port 114A and right inlet port 114B respectively.

The liquid dispensing apparatus adapted for use with the illustrated embodiment is organized such that power is supplied to only one of the electrical supply receptacles 108A-B at a time. Thus, the embodiment of FIG. 1 generally causes liquid to be fed to only inlet port 114A or inlet port 114B at a time. The liquid which is fed to either inlet port 114A or inlet port 114B is directed to outlet port 116.

For example, when the illustrated embodiment is first installed at a site, a left pump may first pump all of the liquid out of a left supply receptacle at which time the illustrated embodiment activates a right pump causing fluid to be withdrawn from a right liquid supply receptacle. One application for which the described embodiment is particularly suitable is maintaining a supply of chlorination chemical to be metered into the pool water as the pool water is recirculated.

By use of the described embodiment, the operator of the swimming pool need not regularly check the level of chlorination chemicals in a supply tank receptacle but can rely on the described embodiment to select a non-empty supply receptacle upon the emptying of previously selected supply receptacle. The embodiment then indicates the empty condition of any of the supply receptacles to the operator.

While the described embodiment is particularly adapted for use in a liquid dispensing apparatus having two liquid supply receptacles, the inventive concepts taught herein may be applied in liquid dispensing apparatus including more than two liquid supply receptacles.

Figure 1A:
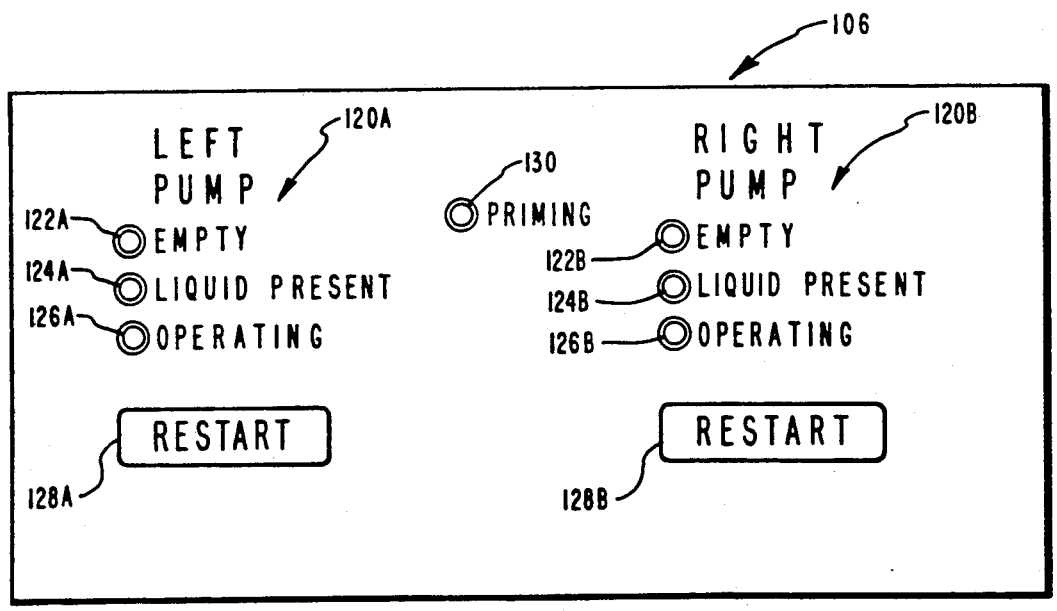
FIG. 1A is a detailed view of the indicator and control panel represented in the embodiment of FIG. 1.

FIG. 1A provides a more detailed view of the indicator and control panel 106. As explained, the described embodiment is particularly adapted for use with two liquid supply receptacles each associated with their own independent pump. as shown in FIG. 1A, the indicators and restart switch, generally represented at 120A, are associated with the left pump while the indicators and restart switch associated with the right pump are generally designated 120B. Thus, each pump has an identical set of indicators.

The indicators represented at 120A-B provide a visual indication of when a liquid supply receptacle has been emptied and the operating status of the embodiment. In accordance with one aspect of the present invention, means for visually indicating when a supply receptacle has been emptied is provided. While many structures may perform such a function, it is presently preferred that the indicators 122A-B represented in FIG. 1A be used to perform this function. Furthermore, in accordance with the present invention, a means for manually inputting that one or both liquid supply receptacles have been refilled is provided. In the described embodiment, restart switches 128A-B perform this function.

Each set of indicators has a particular function which will now be explained. Indicators 124A-B show when liquid is present in the sensing chamber (not shown in FIG. 1A). Indicators 126A-B show when the system is properly operating. Futhermore, indicator 130 reports when another supply receptacle has been selected (i.e., when the switch over of the pumps has just occurred) and the connections to the appropriate inlet are being primed with a liquid from the supply receptacle.

Restart switches 128A-B are actuated by an operator each time an empty supply receptacle is refilled or replaced with a full supply receptacle. Actuation of the appropriate restart switch 128A or 128B signals to the described embodiment that the corresponding supply receptacle has been refilled and liquid can be withdrawn therefrom. In the described embodiment, actuation of the restart switches 128A-B will cause the embodiment to immediately select the appropriate liquid supply receptacle.

Figure 2:
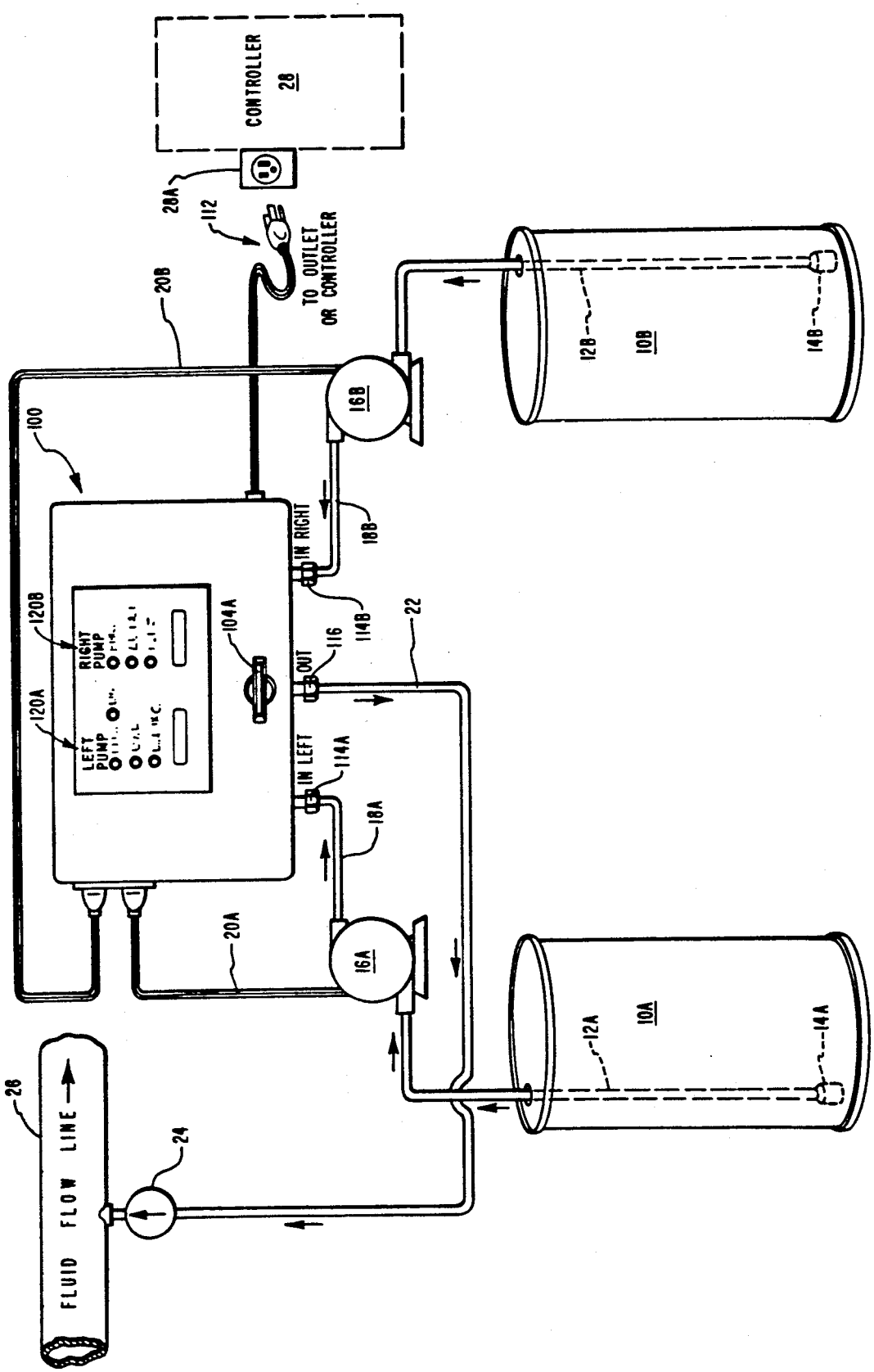
FIG. 2 is a diagram illustrating the relationship between the embodiment represented in FIG. 1 and other components of a liquid dispensing apparatus.

Referring now to FIG. 2, the relationship of the embodiment illustrated in FIG. 1, and designated 100, to other components of a fluid dispensing apparatus will be explained. While the inventive concepts taught herein have application in many circumstances, the present invention will be explained by describing the operation of an embodiment associated with two liquid supply receptacles 10A and 10B in FIG. 2.

As used herein, the term "liquid supply receptacle" may include any container-like vessel used to hold a liquid. For example, a liquid supply receptacle may include portable vessels containing less than five gallons of liquid as well as large permanently installed vessels containing thousands of gallons of liquid. Moreover, liquid supply receptacles may be familiar fifty-five gallon drums which are vented to the atmosphere, such as are represented in FIG. 2 at 10A and 10B. Additionally, liquid supply receptacles may include sealed vessels having only a small amount of gas trapped within the vessel with the liquid.

Referring again to FIG. 2, into each supply receptacle 10A-B is placed an intake pipe 12A-B, respectively. Each intake pipe 12A-B is provided with a intake filter nozzle 14A-B, respectively.

In the liquid dispensing apparatus represented in FIG. 2, a pump 16A-B is provided for each liquid supply receptacle 10A-B to feed liquid to left inlet port 114A and right inlet port 114B by way of pump outlet lines 18A-B, respectively. While pumps 16A-B are represented in the figures, those skilled in the art will appreciate that the inventive concepts taught herein may have application in gravity fed liquid dispensing apparatus as well as other dispensing apparatus, for example, an apparatus which expels a liquid from pressurized supply receptacles.

The liquid dispensing apparatus represented in FIG. 2 has particular application as a swimming pool chlorination apparatus. In such a chlorination apparatus, supply receptacles 10A-B are filled with appropriate aqueous chlorination liquid. The purpose of a swimming pool chlorination system is to maintain the amount of chlorine chemical dispersed in the swimming pool water somewhere between preselected high and low values. One way of accomplishing this purpose is to monitor the liquid present within a flow through a fluid flow line as shown in 26 in FIG. 2.

The fluid flow line contains water which has been taken from the swimming pool to be treated and then returned to the swimming pool. Monitoring of the condition of the water in the fluid flow line 26 is carried out by controller 28 represented in FIG. 2. Controller 28 determines the level of the chlorine chemical in the swimming pool water and, conventionally, would activate a pump, such as pump 16A or pump 16B, when the chlorine level needs to be increased. In previously available apparatus a pump (such as pump 16A) would be electrically connected directly to receptacle 28A.

Using the embodiment 100 of the present invention described herein, power cord 112 is connected to the receptacle 28A. Thus, in the arrangement represented in FIG. 2, AC power is supplied to the embodiment 100 only when controller 28 desires that additional liquid be added to the fluid flow line 26. As will be explained shortly, the embodiment 100 is provided with means for maintaining the 21 memory functions of the system during the time when no AC power is applied.

It will be appreciated that the organization of the embodiment 100 described herein is particularly suited to allow easy installation in swimming pool chlorination apparatus such as represented in FIG. 2 and other similarly controlled liquid dispensing apparatus. Nevertheless, it will be readily apparent that any liquid dispensing apparatus requiring continual periodic dispensing of a liquid may benefit from the present invention. In applications where continuous supply of a liquid is needed, the power supply cord 112 may be connected to a constant source of AC power and all functions of the embodiment 100 will operate without interruption.

Continuing to refer to FIG. 2, during operation of the embodiment 100 liquid is pumped from a first liquid supply receptacle, for example the left supply receptacle 10A, and is fed into the embodiment 100 by way of inlet port 114A. Liquid flowing through the embodiment 100 exits by way of outlet port 116 and travels through outlet line 22 through flow control device 24 into fluid flow line 26. Flow control device 24 may be a check valve or, when precise measurement of the amount of liquid entering the fluid flow line 26 is required, flow control device 24 may be one of many metering devices available in the art.

Still referring to FIG. 2, during operation as left supply receptacle 10A is emptied, both liquid and gas (for example, ordinary air) enter intake pipe 12A and are fed into the embodiment 100 by way of left inlet port 114A. As the left liquid supply receptacle 10A becomes substantially emptied, gas bubbles appear in the liquid flow. The presence of undissolved gasses, i.e., bubbles, in the liquid flow is detected by the embodiment 100 by sensing the change in the dielectric constant of the fluid flow.

When bubbles are detected, the embodiment begins operation of pump 16B in order to withdraw fluid from right liquid supply receptacle 10B. Additionally, the appropriate indicator illuminates to show that the left liquid supply receptacle 10A has been emptied and that right liquid supply receptacle is now being used as a source of liquid. In this fashion, the embodiment 100 allows a source of liquid to be automatically maintained.

Moreover, while not explicitly represented in FIG. 2 but as will be explained shortly, embodiment 100 allows a remote annunciator to be activated, such as a visual or aural alarm, giving immediate notice to an operator that a liquid supply receptacle has been emptied.

It will be appreciated that the inventive concepts taught therein may be used in a system for detecting gas bubbles in a liquid flow. For example, the components of the described embodiment of the present invention may be adapted to just detect the presence of gas bubbles in a liquid flow and then activate an alarm means. Embodiments of an alarm means may include a visual indicator, such as a light, an aural indicator, such as a bell, or some other alarm device. Moreover, the present invention may also have application for detecting the presence of a second immiscible liquid introduced into a second immiscible liquid. For example, water and many types of oil are immiscible liquids which have different dielectric constants. The inventive concepts taught herein may be used to detect the presence of oil in a water or the presence of water in an oil. Advantageously, it will be appreciated that since the embodiment 100 does not merely sense the level of liquid in the liquid supply receptacle, but actually detects the presence of a liquid in the embodiment, failures such as tubing punctures and pump breakdowns also cause the other liquid supply receptacle to be used as the source of supply.

As used herein, the terms "fluid," "liquid," and "gas"- 'are intended to have their ordinary meanings. That is, fluid is intended to designate any substance that can flow whether it is liquid or gas. Thus, the mixture of a liquid and a gas together, as well as either or a liquid or a gas alone, may be properly referred to as a fluid. Furthermore, it will be understood that the term "gas" also includes the vapors of a liquid which may be contained within a liquid supply receptacle.

As will now be appreciated, the presently preferred embodiment 100 provides a system for automatically maintaining a source of liquid supply which overcomes many of the disadvantages and drawbacks previously experienced. Further details concerning the inventive concepts of the present invention as well as the structure and method incorporated into the presently preferred embodiment described herein will now be given in connection with the remaining figures.

FIG. 3 is a partially cut-away perspective view of the embodiment represented in FIG. 1 wherein latch 104B is positioned so as to allow upper housing 102A to be raised from lower housing 102B. In the partially cut-away portion of upper housing 102A, circuit board 152 is partially shown. The circuit board 152 contains many of the electrical components of the embodiment including those of the indicator and control panel (106 in FIG. 1) and is connected to other components illustrated in the drawings by cables 154 and 156.

In accordance with one aspect of the present invention, sensing means is provided for sensing changes in the dielectric constant of the fluids flowing through the embodiment 100. It will be appreciated that many different devices and components can be used for sensing changes in the dielectric constant of the fluid flowing through the embodiment.

As shown by way of example and not limitation, a capacitive proximity sensor, generally designated 146 in FIG. 3, serves as a sensing means in the presently preferred embodiment. The capacitive proximity sensor 146 is held in position by bracket 148 which is attached to lower housing 102B, and attached to the bracket 148 by nuts 150. Desirably, nuts 150 and bracket 148 allow the distance between the end of the capacitive proximity sensor 146 and sensing chamber 144 to be adjusted for purposes which will be shortly more fully explained.

It is presently preferred that the capacitive proximity sensor 146 be one which is available from Omron Tateisi Electronics Co. of Kyoto, Japan and most preferably part number E2K-X4MY1. Nevertheless, it will be readily surmised that other capacitive proximity sensors or devices and components which perform similar or equivalent functions may also be utilized according to the concepts taught herein.

As represented in FIG. 3, a sensing chamber 144 is provided which comprises a length of nonmetallic tubing. Nevertheless, it will be appreciated that, depending upon the particular application of the inventive concepts taught herein, the sensing chamber may take many different forms and be comprised of many different nonmetallic materials.

Both left inlet port 114A and right inlet port 114B are in fluid communication with sensing chamber 144 by way of tubing 140A and 140B and a T-connector 142. Thus, any fluid which is fed into either inlet port 114A or inlet port 114B will be directed toward sensing chamber 144 by the T-connector 142.

It will be readily appreciated that the structure of the embodiment 100 represented in FIG. 3 provides highly reliable operation since no valves or complicated mechanical flow control mechanism is required internally to the embodiment.

One of skill in the art will understand that while the described embodiment is presently preferred for use in limited applications, other embodiments carrying out the inventive concepts may be best suited in other applications. For example, in some applications it may be best to include a plurality of capacitive proximity sensors as a sensing means, such as one for each liquid supply receptacle. Utilizing the concepts and teachings contained herein, the present invention may be readily applied in many circumstances and in many different forms.

Figure 4:
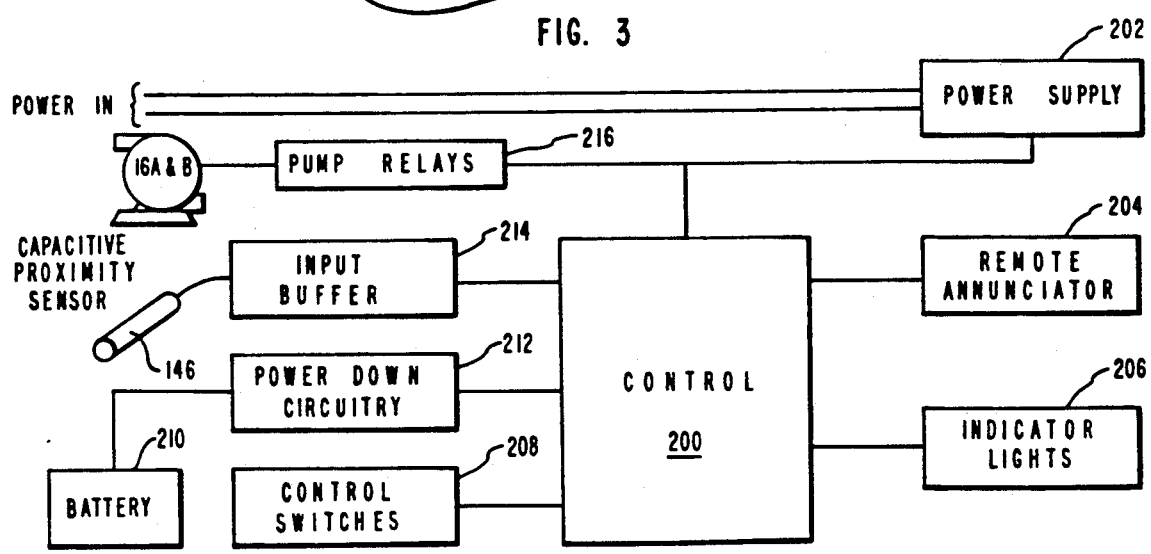
FIG. 4 is a block diagram representing the major functional blocks of the embodiment illustrated in FIG. 1.

Referring now to FIG. 4, the organization and structure of the electrical components of the presently preferred embodiment will be described. FIG. 4 is a high level block diagram showing the major functional blocks of the electrical components contained in the embodiment 100 represented in FIGS. 1-3.

As is known in the art, a power supply 202 is provided to supply proper DC voltages to the electrical and electronic components represented in FIG. 4 from the nominal 120VAC 60Hz power input to the embodiment.

Represented again in FIG. 4 is the preferred capacitive proximity sensor 146. It will be appreciated that capacitive proximity sensor 146 is desirably a self-contained and sealed unit requiring DC power input and providing a single output which is asserted (i.e., turned on) when the sensed dielectric constant changes by at least a threshold amount. Those familiar with the preferred capacitive proximity sensor 146 and equivalent devices will understand that an amount of hysteresis must be overcome before the output of the capacitive proximity sensor 146 will change states.

In operation, the embodiment is programmed such that as the percentage of gas in the liquid/gas mixture contained within the sensing chamber 144 reaches a threshold (indicating that the selected liquid supply receptacle has been emptied) the output of the capacitive proximity sensor 146 changes states. Since the sensitivity of the specified capacitive proximity sensor is fixed, the threshold at which the output of the capacitive proximity sensor changes states may be varied by the altering distance between the capacitive proximity sensor 146 and the sensing chamber 144 as shown in FIG. 3.

Advantageously, the use of the capacitive proximity sensor 146, or a device or structure performing similar or equivalent functions, provides that no direct contact between the sensing element and the fluid being dispensed occurs. Since such fluids are often highly reactive, corrosive, or destructive, avoiding direct contact with the capacitive proximity sensor 146 simplifies the design, and lowers the expense of, the presently preferred embodiment. Nevertheless, in some applications it may be advantageous to utilize a sensing means other than a capacitive proximity sensor, for example, by attaching sensing components directly to, or fabricating them within, the wall of sensing chamber 144.

An input buffer 214 in FIG. 4 receives the output from capacitive proximity sensor 146 and filters and conditions the capacitive proximity sensor output before it passes along to a control block 200.

In the presently preferred embodiment, the control block 200 of FIG. 4 primarily comprises a microprocessor to be described more fully hereinafter. The use of a microprocessor allows the functions of the various components represented in FIG. 4 to be readily controlled as well as allowing the methods of the present invention to be carried out precisely so that the purpose of maintaining a source of liquid supply may be reliably carried out by the embodiment.

In accordance with one aspect of the present invention, detection means is provided for detecting when the changes in the dielectric constant of the fluid changes by a predetermined threshold. In the embodiment described herein, the detection means function is carried out by the components of the control block 200. Nevertheless, as is the case with many aspects of the present invention, this function may be carried out by a single device, for example, a large scale integrated circuit carrying out all or some of the functions represented by the blocks of FIG. 4.

In accordance with another aspect of the present invention, restarting means is provided for signalling to the embodiment when a supply receptacle has been refilled or replaced, when a particular liquid supply receptacle is to be manually selected, or some other fault has been remedied. By way of example and not limitation, control switches 208 in the preferred embodiment function as a restarting means. Each of the control switches 208 are connected to the microprocessor of the control block 200.

In accordance with yet another aspect of the present invention, a power back-up means is provided to ensure that at least some of the functions of the presently preferred embodiment continue even when external power is not applied to the embodiment. An example of one possible arrangement of a power back-up means is the example of a battery 210 and power down circuitry 212 represented in FIG. 4. Further information concerning the components represented by these functional blocks will be provided with connection with FIGS. 5A and 5B.

In accordance with still another aspect of the present invention, selection means is provided for selecting one nonempty liquid supply receptacle as a source of liquid from a plurality of liquid supply receptacles. Depending upon the actual configuration of the liquid supply receptacle, the selection means may be embodied in many different forms. In the presently preferred embodiment, selection means may comprise pump relays 216 which control pumps 16A and 16B. As will become clear shortly, while pump relays 216 are preferred for use in the described embodiment, other devices such as solid state components which perform the function of selection means may also be utilized in embodiments of the present invention.

The present invention may also include indicator means and means for announcing to a point remote from the liquid supply receptacles that another supply receptacle has been selected or the status of some other embodiment function. In the embodiment represented in FIG. 4, indicator lights 206 are used both to display the status of the embodiment (i.e., empty, fluid present, operating, or priming) and the indicator lights function as an indicator means. Also, by way of example, a remote annunciator 204 may perform the function of a remote annunciation means for announcing to a point remote from the liquid supply receptacles that a liquid supply receptacle has been emptied.

Both the indicator means and the remote annunciation means may include either visual or aural signals which may alert an operator of the status of the embodiment. For example, the remote annunciator 204 may include a set of indicators which are connected by wire, telephone lines, or a radio frequency link to a station remote from the liquid supply receptacles.

As mentioned previously, the presently preferred embodiment utilizes a microprocessor for carrying out the functions of the detection means as well as other functions. The use of the microprocessor is particularly advantageous since it provides flexibility in operating the embodiment and allows various parameters to be readily changed in order to adapt to particular circumstances.

Figure 5A:
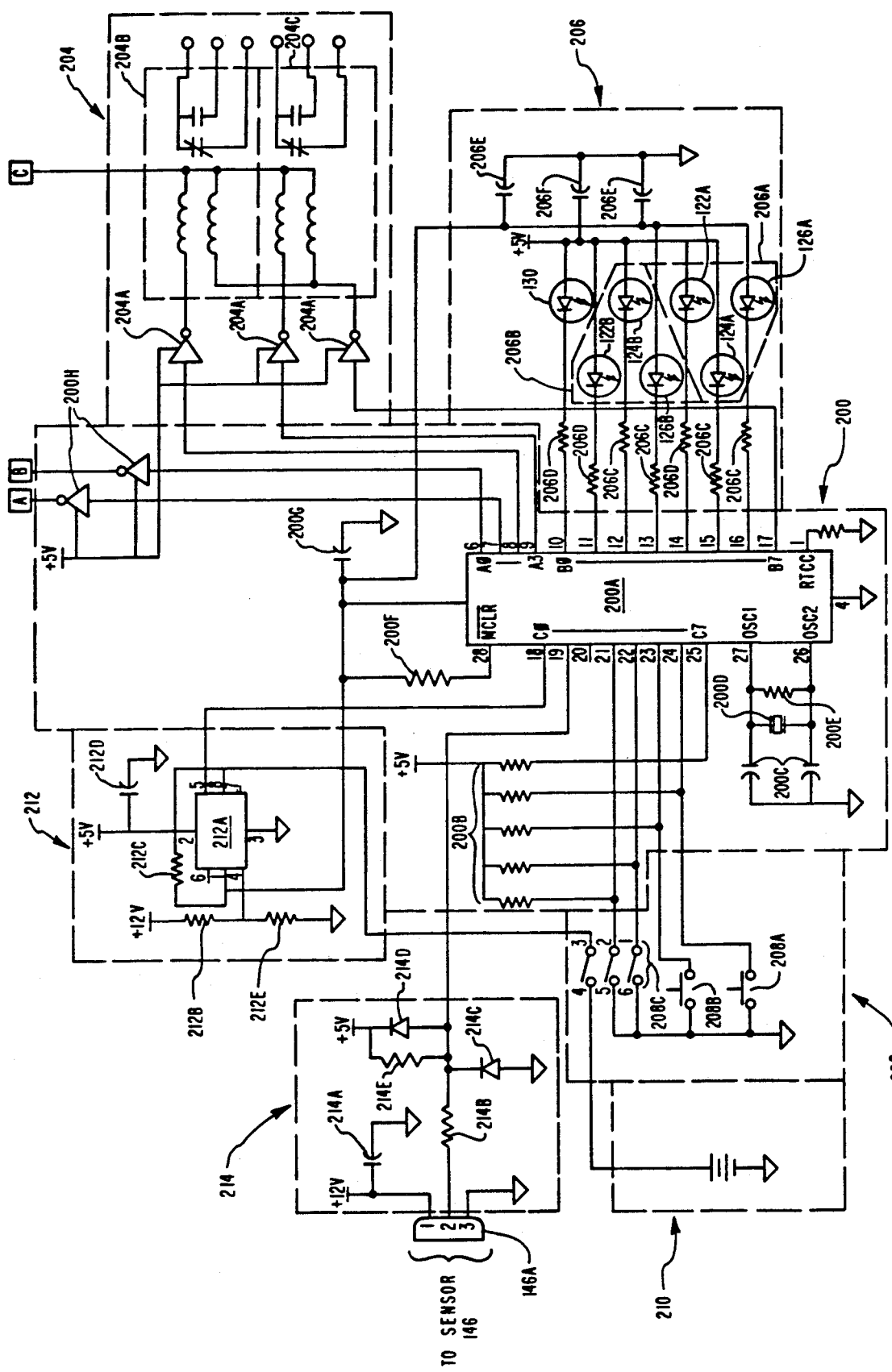
FIGS. 5A and 5B are detailed schematic diagrams illustrating the arrangement of the electrical components included in the embodiment of FIG. 1.
Figure 5B:
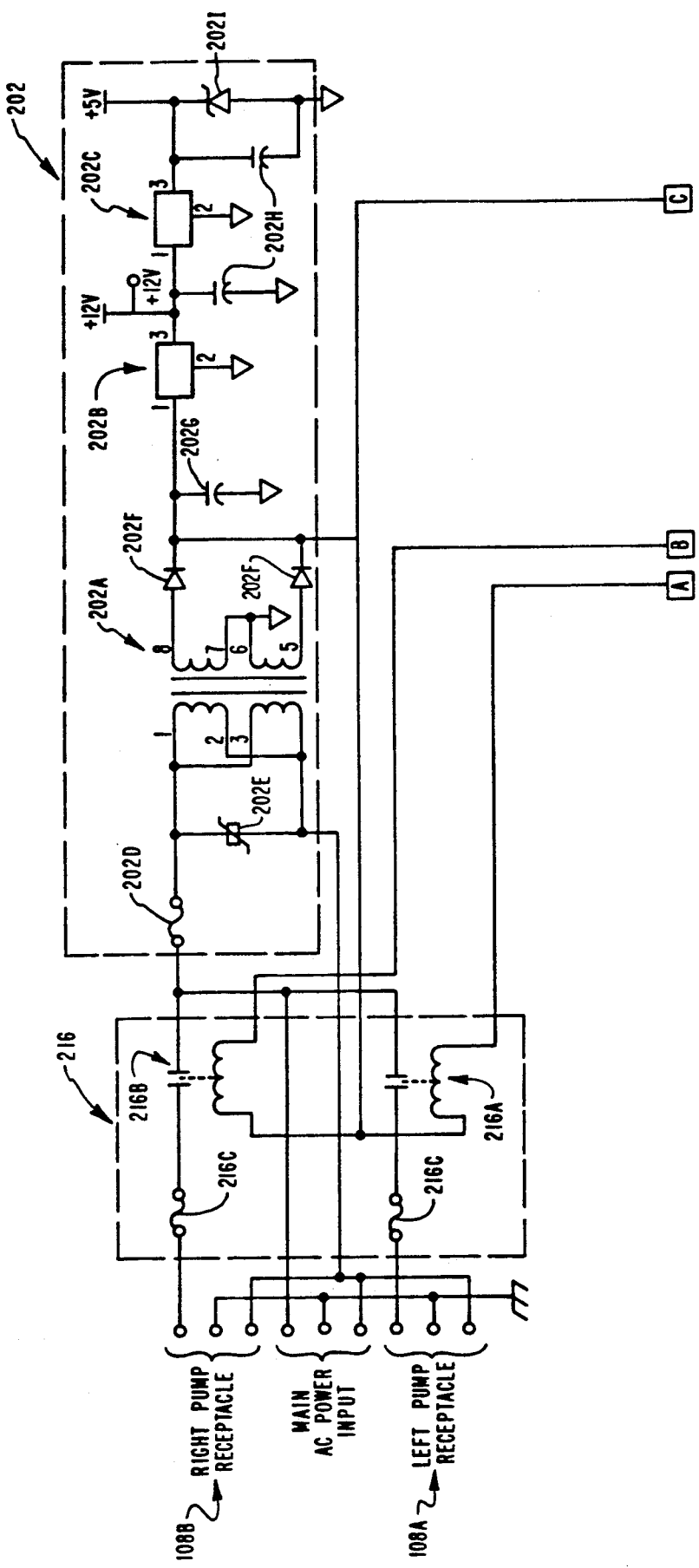

FIGS. 5A and 5B are detailed schematic drawings of the presently preferred embodiment of the present invention represented in FIGS. 1–4 and which provide examples of components and structures which can be used to carry out the present invention.

Beginning with FIG. 5A, a connector 146A is represented. Connector 146A receives the three conductor cable provided on the previously described capacitive proximity sensor. As noted, the capacitive proximity sensor preferred for use in the described embodiment requires only three electrical connections which are represented as conductor 1, 2, and 3 in connector 146A. Conductor 1 provides 12 volts D.C. to the sensor 146 while conductor 3 provides a ground connection. Conductor 2 provides a path for the signal output from the capacitor proximity sensor 146. As mentioned previously, the capacitor proximity sensor outputs a signal which alternates between two states, asserted (ground) and unasserted (open collector).

The components shown within block 214 are one example of components which carry out the functions of an input buffer represented in FIG. 4. The representative values of each of the components represented in block 214 are provided below.

| | |
|---|---|
| Capacitor 214A | 10 microfarad, 25 volts |
| Resistor 214B | 100 ohms |

-continued

| | |
|---|---|
| Diode 214C | 1N4148 |
| Diode 214D | 1N4148 |
| Resistor 214E | 10K ohms |

The signal which is output from the capacitive proximity sensor and processed by the input buffer 214 is input to a microprocessor 200A as shown in block 200 of FIG. 5A. In the preferred embodiment, microprocessor 200A is a general purpose microprocessor which is particularly adapted for incorporation into the system of the present invention. More specifically, microprocessor 200A is a low power consumption microprocessor which may enter a very low power consumption sleep state. Provided below is a list of representative values and device designations for the components represented in block 200 of FIG. 5A.

| | |
|---|---|
| Microprocessor 200A | 16C55 |
| Resistors 200B | 10K ohm each |
| Capacitors 200C | 100 picofarad |
| Crystal 200D | 455 KHz ceramic resonator |
| Resistor 200E | 1M ohm |
| Resistor 200F | 100K ohm |
| Capacitor 200G | .1 microfarad |
| Inverters/drivers 200H | ULN 2004 |

In order to provide a power back up function, a rechargeable battery, included in block 210 of FIG. 5A, and power down circuitry, included in block 212 of FIG. 5A, is provided in the described embodiment. As is known to those skilled in the art, a power source must be maintained for the correct operation of the memory and other functions of microprocessor 200A and an orderly transition from A.C. power to internal D.C. power must occur when AC power is removed.

Representative values and device designations are provided for the components represented in blocks 210 and 212.

| | |
|---|---|
| Battery | 3.6 Volt Nicad Rechargeable Battery |
| IC 212A | MAX 690 |
| Resistor 212B | 10K ohm |
| Resistor 212C | 100 ohm |
| Capacitor 212D | .1 microfarad |
| Resistor 212E | 1.5K ohm |

The components represented in block 208 of FIG. 5A comprise the control switches of the described embodiment. Switches 208A and 208B are normally open momentary contact switches which serve as the restarting switches (128A-B in FIG. 1A).

Switch block 208, which preferably is mounted on circuit board 152, includes three switches. The two switches including contacts 1-6 and 2-5 enable the selection of one of four available times for the maximum allowed pump priming time before the embodiment will select another liquid supply receptacle. The programmed available times in the described embodiment are 1, 60, 120, and 255 seconds. The switch including contacts 3-4 serves to disconnect the battery, for example during shipping, installation, and long periods of non use.

The components represented in block 206 of FIG. 5A include the indicator lights represented in the indicator and control panel 106 shown in FIG. 1A. Each of the indicator lights is preferably a light emitting diode. Light emitting diodes included in block 206A are associated with the "left side" of the embodiment while those included in block 206B are associated with the "right side" of the embodiment. Provided below is a list of the values and device designations of the components represented in block 206.

| | |
|---|---|
| LED 130 | red LED |
| LEDs 122A-B | red LEDs |
| LEDs 124A-B | yellow LEDs |
| LEDs 126A-B | green LEDs |
| Resistors 206C | 270 ohms |
| Resistors 206D | 330 ohms |
| Capacitors 206E | 470 microfarad, 10 volts |
| Capacitor 206F | 10 microfarad, 25 volts |

As explained previously, a desirable feature of the present invention is the capacity to announce to a location remote from the liquid supply receptacles that one or more of the liquid supply receptacles is empty. One example of the presently preferred structure used to carry out this function are the components included in block 204. The components included in block 204 of the remote annunciator include inverters/drivers 204A which preferably are devices commonly designated ULN 2004 in the art. Also represented in block 204 are latching relays 204B and 204C. One having ordinary skill in the art will readily be able to utilize latching relays 204B and 204C to communicate to a location remote from the liquid supply receptacles the status of the described embodiment. FIG. 5B is a detailed schematic diagram representing the components included in the power supply block 202 and the pump relay block 216 represented in FIG. 4. The values and device designations of the components represented in power supply block 202 are listed below.

| | |
|---|---|
| Transformer 202A | 115 volt-12 volt center tapped transformer |
| Integrated Circuit 202B | 12 volt voltage regulator 7812 |
| Integrated Circuit 202C | 5 volt voltage regulator 7805 |
| Fuse 202D | .5 amp |
| Metal Oxide Varistor 202E | 130 volts |
| Diodes 202F | 1N4007 |
| Capacitor 202G | 2200 microfarads, 35 volts |
| Capacitors 202H | .1 microfarad |
| Diode 202I | 5.0 volt transzorb |

Represented in block 216 are the pump relays 216A and 216B. It will also be noted that each pump relay is protected by a fuse 216C, which preferably is a 10 amp fuse. The pump relays are actuated by passing current through their respective coils. The passage of current through their coils is controlled by the microprocessor 200A (FIG. 5A) as amplified by drivers 200H. As can be seen in FIG. 5B, pump relay 216A, when activated, to left pump receptacle 108A. Similarly, pump relay 216B, when activated, provides A.C. power to right pump receptacle 108B. Also shown in FIG. 5B is the main A.C. power input which, in the described embodiment, generally refers to power cord 112 represented in FIGS. 1 and 3.

It must be appreciated that the described embodiment is merely the presently preferred method of carrying out the inventive concepts taught and claimed herein and that many devices and arrangements of those devices other than those explicitly described herein may be used to carry out the present invention. For example, by utilizing modern integrated and hybrid circuit technology, those having skill in the appropriate arts can fabricate a single component designed to carry out many, if not all, of the functions described herein.

Figure 6A:
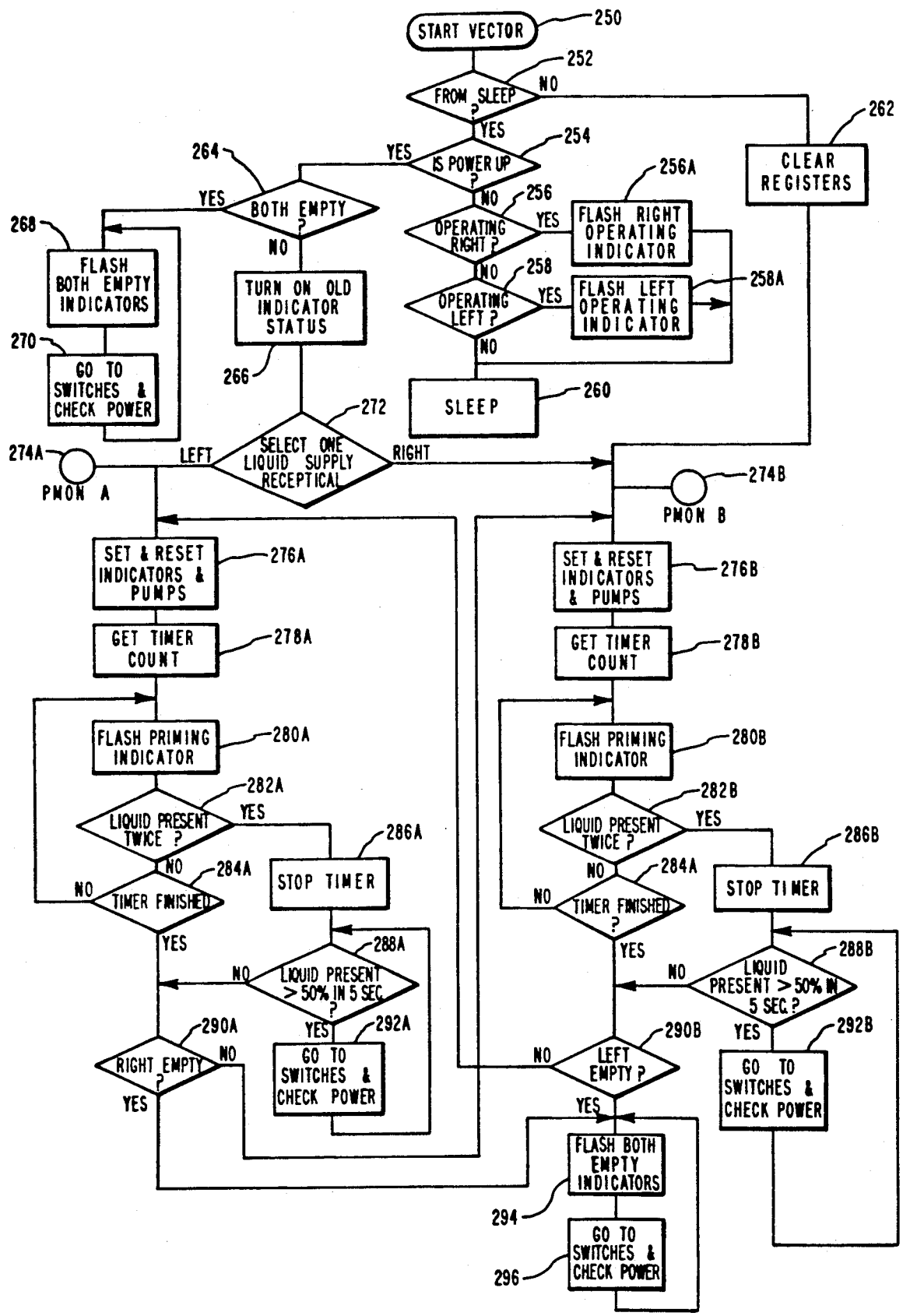
FIGS. 6A, 6B, and 6C are flow charts representing the presently preferred method of operation of the embodiment represented in FIG. 1.
Figures 6B, 6C:
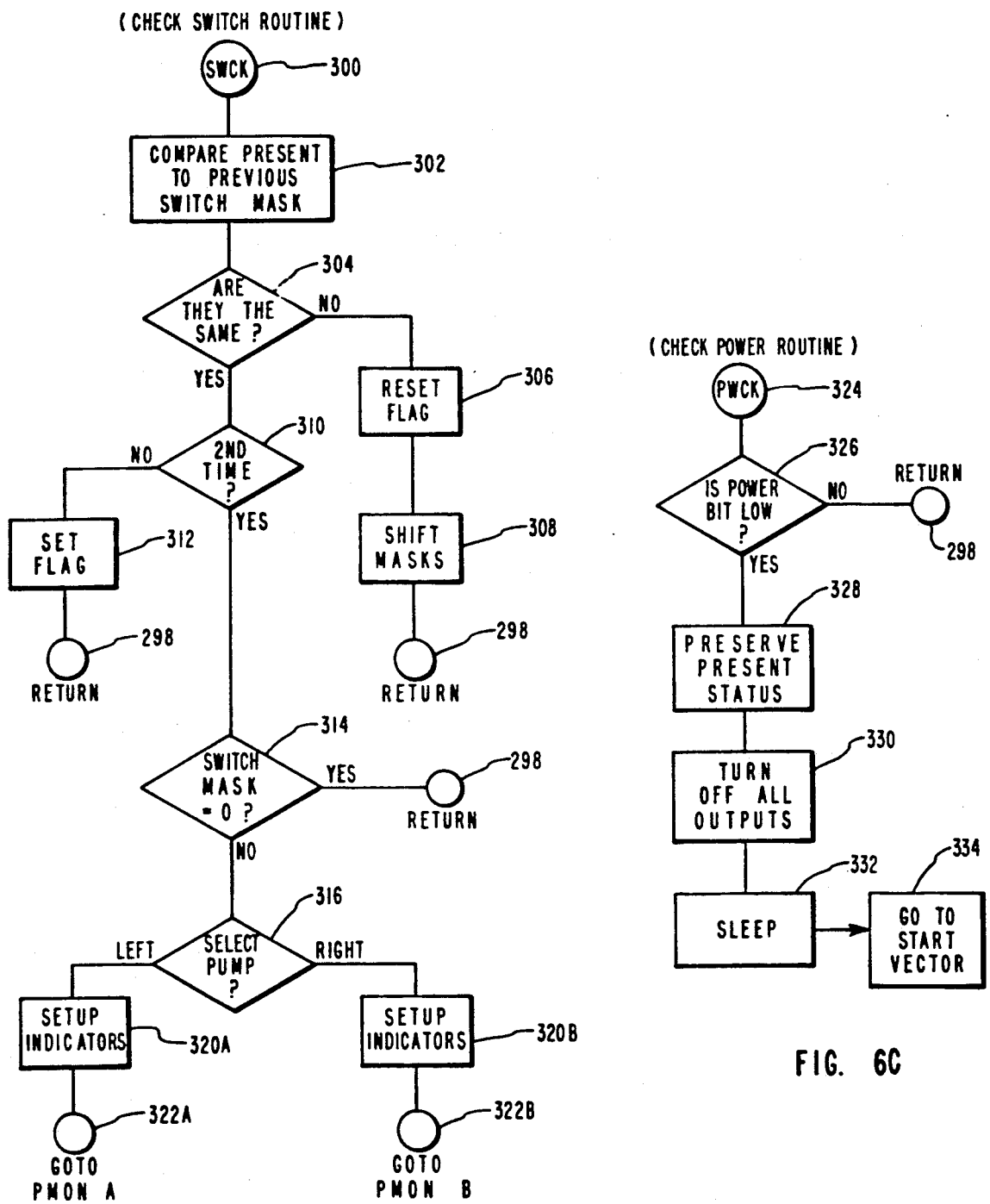

The flow charts in FIGS. 6A-6C indicate the presently preferred method of operation of the components of the system previously discussed. The flow charts of FIGS. 6A-6C are representations of the steps carried out in the programming code utilized by the microprocessor included in the embodiment. Attached hereto as Exhibit A is an example of programming code which may be used to carry out the inventive method taught herein.

Represented in FIG. 6A is a start vector 250 at which program flow begins. Since the presently preferred embodiment is adapted to routinely have AC power turned on and off, a microprocessor having a low power consumption sleep state is utilized As will be explained shortly, when AC power is removed from the embodiment, the microprocessor enters a sleep state which allows the battery to provide power back-up for long periods of time.

At step 252, the microprocessor determines whether or not it is awakening from a sleep state. If it is not awakening from a sleep state it is assumed that it is undergoing initial power up in which case the microprocessor registers are cleared as indicated at step 262. Once the microprocessor registers are cleared, the steps following the PMONB (pump monitoring B) label at 274B are carried out.

From step 252, if it is determined that the microprocessor is awakening from a sleep state, it is then determined whether or not AC power is up and supplied to the embodiment as represented at step 254. If the AC power is not up, the microprocessor determines whether the right pump was the last pump operating at step 256. If the right pump was the last pump operating, the microprocessor flashes the right operating indicator as shown at step 256A and the microprocessor returns to the sleep state as indicated at step 260. If the right pump was not the last pump operating, it is then determined whether the left pump was the last pump operating at step 258 and if so, the left operating indicator is flashed as shown at step 256A before returning to the sleep state as shown at step 260.

Returning to step 254, if it is determined that AC power is up, it is decided whether both liquid supply receptacles were empty at step 264. If it is determined that both liquid supply receptacles were empty at the time of the last power down, both empty indicators are flashed at step 268 and the check switch routine (FIG. 6B) and the check power routines (FIG. 6C) are run as indicated at step 270. The steps of the check switch routine and the check power routine are carried out and, if during the course of these routines it is determined that, for example, a restart switch was actuated, control will be passed to the appropriate portion of the program as will be explained shortly.

If, at step 264, it is determined that both liquid supply receptacles are not empty, the indicator status at last power down is turned on as shown at step 266 and the microprocessor determines at step 272 whether the left or right pump should be activated.

After step 272, as represented in FIG. 6A, the pump monitoring portion of the program is entered, either PMONA or PMONB, each having a label designated 274A or 274B, respectively. Both pump monitoring portions of the program are substantially identical to each other so they will be explained together.

Next, the indicators and pumps are set and reset as necessary (step 276A-B) and the microprocessor gets the timer count (steps 278A-B). The priming indicator is flashed at step 280A-B as liquid feed from the appropriate pump is begun. If liquid is detected at least twice (step 282A-B) then the timer is stopped (step 286A-B) and it is determined whether liquid was sensed more than 50 % of a time in a five second period (step 288A-B). If not, then it is determined whether the right supply receptacle is empty (step 290A) or the left supply receptacle is empty (step 290B). If after the check carried out at step 290A or 290B, it is determined that the other liquid supply receptacle is not empty, program control switches to the other liquid supply receptacle. Steps 280A-B and 282A-B are looped unless fluid is sensed twice.

At step 288A-B, if liquid was present more than 50% of the time in a five second period, operation continues with the selected liquid supply receptacle as a source of liquid. Also, as indicated, at steps 292A-B both the check switch routine and the check power routine are continually run.

If both the right and the left supply receptacles are determined to be empty, both empty indicators (122A-B in FIG. 1A) are flashed (step 294) and the check switches and check power routines are initiated (step 296). It will be realized that the exemplary parameters and steps discussed above may be substituted with other steps and parameters which can be devised by one having skill in the art and to suit particular applications. For example, the parameter of detecting the presence of fluid more than 50 % of the time during a five second period (steps 288A-B) may be altered to suit particular applications.

FIG. 6B provides a flow chart for the check switch routine which begins at step 300. At step 302, the microprocessor compares the present switch mask to the previous switch mask to determine whether the restart switches (128A-B in FIG. 1A) have been actuated. It is then determined whether or not the previous switch mask is equal to the present switch mask (step 304) and if they are not equal a flag is reset (step 306), the masks are shifted (step 308) and the check switch routine returns control to the main program (FIG. 6A). Referring again to step 304, if the switch masks are the same, the comparison is made a second time as indicated at step 310 and if it is the first time that they are equal, the flag is set (step 312) and the check switch routine returns control to the main program (step 298).

Referring again to step 310, if is the second time that the previous switch mask is equal to the present switch mask it is determined whether the switch mask is equal to zero at step 314. If the present switch mask equals zero, the check switch routine ends and control returns to the main program. If the present switch mask does not equal zero then a pump is selected at step 316, the indicators are set up as represented at step 320A-B, and control returns to the main program either at the PMONA label or at the PMONB label (step 322B).

FIG. 6C is a flow chart showing the steps included in the check power routine which begins at step 324. If a "power bit" which is input to the microprocessor is not low (step 326) then control returns to the main program (step 298). If the "power bit" is low, then steps are taken to allow an orderly power down. If it is necessary to power down, the present status of the embodiment is preserved in memory as indicated at step 328 and all outputs are turned off as indicated at step 330. The microprocessor then enters a sleep state as shown at step 332. Once the microprocessor enters the sleep state, as required by step 334, it awakens every 2-3 seconds and the program returns to the start vector (250 in FIG. 6A).

From the foregoing, it will be appreciated that the present invention provides a dependable and cost effective system for automatically maintaining a source of liquid to a liquid dispensing apparatus by selecting one nonempty liquid supply receptacle from among a plurality of supply receptacles. Moreover, embodiments of the present invention may be left to operate unattended for long periods of time away from human attention. Furthermore, embodiments of the present invention may include remote annunciators to report to distant location the status of the embodiment. Still further, the system of the present invention does not require that the sensing element directly contact the liquid being dispensed which may often be a concentrated corrosive substance.

The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A swimming pool maintenance system for selecting one of a plurality of supply receptacles as a source of a liquid flow of chemicals to the water of the swimming pool, each of the liquid supply receptacles containing both a liquid and an undissolved gas, the system comprising;
   (a) a nonmetallic conduit adapted to accommodate a liquid flow of chemicals from a selected one of the liquid supply receptacles to a fluid output line, said conduit being placed in fluid communication at a first end thereof with the fluid output line and commonly connected at a second end thereof to the liquid supply receptacles;
   (b) sensing means located on the exterior of the conduit for sensing the dielectric constant of the liquid and any undissolved gas present in the flow of the liquid through the conduit;
   (c) detection means for detecting a threshold change in the dielectric constant of the contents of the flow of the liquid through the conduit, said threshold change corresponding to an amount of undissolved gasses contained in the flow of the liquid in the conduit reflecting that the selected one of the liquid supply receptacles is substantially empty of the liquid; and
   (d) selection means for selecting a non-empty supply receptacle as a source of supply of the liquid to flow through the conduit to the fluid output line when the detection means detects the threshold change in the dielectric constant of the contents of the conduit, thereby maintaining a source of liquid for the flow through the conduit to the fluid output line.

2. A system as recited in claim 1, wherein the system further comprises a rechargeable battery and a power backup circuit for maintaining the system by battery power when AC power is not available to the system.

3. A system as recited in claim 1, further comprising means for retaining in a semiconductor memory an identity of the liquid supply receptacle previously selected as the source of the liquid flow of chemicals to the water of the swimming pool.

4. A system as recited in claim 1, further comprising a first fluid inlet port in fluid communication with a first liquid supply receptacle and a second fluid inlet port in fluid communication with a second liquid supply receptacle, the first and the second fluid inlet ports being in fluid communication with said second end of the conduit.

5. A system as recited in claim 1, wherein the sensing means comprises a capacitive proximity sensor.

6. A system as recited in claim 1, wherein the detection means comprises a microprocessor programmed to detect changes in dielectric constant sensed by the sensing means.

7. A system as recited in claim 1, wherein the selection means comprises flow control means for controlling from which liquid supply receptacle liquid is withdrawn and directed to the fluid output line; and, the flow control means comprises a plurality of relay devices adapted for sequentially activating one of a corresponding number of pumps, each of said pumps being connected to one of the plurality of liquid supply receptacles.

8. A system as recited in claim 7, wherein the detection means comprises a microprocessor having an output connected to the flow control means.

9. A system as recited in claim 1, wherein the system further comprises a first pump and a second pump for withdrawing the liquid from first and second liquid supply receptacles, respectively.

10. A system as recited in claim 1, further comprising a visual indicator adapted for showing when any one of the plurality of the liquid supply receptacles is empty.

11. A system as recited in claim 1, wherein the system further comprises remote annunciation means for communicating to a point distant from the liquid supply receptacles when any of the plurality of liquid supply receptacles are empty.

12. An automatic change-over fluid dispensing apparatus for continuously supply a fluid flow of chemicals for the sanitation of a swimming pool from an individual one a plurality of containers of the chemicals, each of the containers having associated therewith a distinct pump by which to advance fluid from the container through the fluid dispensing apparatus into the water of the swimming pool, said apparatus comprising:
   (a) a nonmetallic tubular output conduit adapted to contain the fluid flow of chemicals and being connected at one end thereof to each of the pumps;
   (b) relay means for activating a single one of the pumps to cause the fluid flow of chemicals through said output conduit and into the water of the swimming pool from the container corresponding to said single one of the pumps;
   (c) sensing means located exterior to said output conduit for sensing from an electrical property of the fluid the presence of the fluid flow of chemicals in said output conduit, said sensing means producing an output signal reflective of the quantity of the fluid flow of chemicals in said output conduit; and
   (d) control means coupled to said sensing means for receiving said output signal thereof, for detecting said output signals reflective of less than a predetermined threshold quantity of the fluid flow of chemicals in said output conduit, and for directing said relay means to activate another of the pumps.

13. An apparatus as recited in claim 12, wherein said sensing means detects the dielectric constant of the contents of said output conduit.

14. An apparatus as recited in claim 13, wherein said sensing means comprises a capacitive proximity sensor.

15. An apparatus as recited in claim 12, wherein said output conduit comprises a plastic tube.

16. A swimming pool sanitation system for detecting any interruption in a liquid flow of chemicals into the water of the swimming pool and thereupon for restoring the liquid flow of chemicals, the system comprising:
   (a) a conduit network for directing the liquid flow of the chemicals from a selected individual one of a plurality of containers of the chemicals into the water of the swimming pool, said conduit network having a plurality of inlet tubes each communicating individually at one end thereof with one of the containers and being connected at the other ends thereof to an outlet tube through which the chemicals flow into the water of the swimming pool;
   (b) sensing means located on the exterior of said conduit network for sensing the dielectric constant of the liquid flow of chemicals in said conduit network, said sensing means producing an output signal corresponding to said dielectric constant;
   (c) control means for receiving said output signal from said sensing means and for detecting from any change therein a threshold change in the dielectric constant of the liquid flow of chemicals in said conduit network corresponding to a predetermined percentage of gas bubbles in the liquid flow of chemicals; and
   (d) reaction means for taking measures when said threshold change in the dielectric constant of the contents of said conduit network is detected by said control means to reduce the percentage of gas bubbles in the liquid flow of chemicals in said conduit network by initiating a liquid flow of chemicals from another of said plurality of containers.

17. A system as recited in claim 16, wherein the control means comprises a microprocessor programmed to detect changes in said output signal of the sensing means.

18. A system as recited in claim 16, further comprising visual alarm means for providing an indication of when said threshold change in the dielectric constant of the contents of the conduit network is detected by said control means.

19. A system as recited in claim 16, comprising aural alarm means for providing an indication of when said threshold change in the dielectric constant of the contents of the conduit network is detected by said control means.

20. A system as recited in claim 16, wherein said sensing means comprises a capacitive proximity sensor located outside said conduit network intermediate said selected individual one of said plurality of containers and the water of the swimming pool.

21. A system as recited in claim 20, wherein said capacitive proximity sensor is coupled to said sensing means and located on the exterior of said outlet tube of said conduit network.

22. A system as recited in claim 16, wherein said reaction means comprises a relay associated with each of said inlet tubes coupled to an activated by said control means, operation of each of said relays causing a liquid flow of chemicals in the inlet tube associated therewith.

* * * * *

UNITED STATES PATENT AND TRADEMARK OFFICE
CERTIFICATE OF CORRECTION

PATENT NO. : 5,129,415

DATED : July 14, 1992

INVENTOR(S) : ROBERT R. RUNYON et al.

It is certified that error appears in the above-identified patent and that said Letters Patent is hereby corrected as shown below:

```
Column 2, line 52, "gasses" should be --gases--
Column 5, line 50, "a intake" should be --an intake--
Column 6, line 24, delete "21"
Column 7, lines 29-30, "gas'-'" should be --"gas"--
Column 7, line 33, delete first occurrence of "or"
Column 13, line 8, after "utilized" insert --.--
Column 14, line 52, after "if" insert --it--
Column 15, line 55, "gasses" should be --gases--
```

Signed and Sealed this

Ninth Day of November, 1993

*Attest:*

BRUCE LEHMAN

*Attesting Officer*  Commissioner of Patents and Trademarks